(12) United States Patent
Mondal et al.

(10) Patent No.: US 10,355,757 B2
(45) Date of Patent: Jul. 16, 2019

(54) METHOD AND APPARATUS FOR PERFORMING RADIO-RESOURCE-MANAGEMENT MEASUREMENTS

(71) Applicant: Nokia Solutions and Networks Oy, Espoo (FI)

(72) Inventors: Bishwarup Mondal, Beavercreek, OH (US); Timo Erkki Lunttila, Espoo (FI); Eugene Visotsky, Buffalo Grove, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/547,024

(22) PCT Filed: Jan. 30, 2015

(86) PCT No.: PCT/US2015/013863
§ 371 (c)(1),
(2) Date: Jul. 27, 2017

(87) PCT Pub. No.: WO2016/122622
PCT Pub. Date: Aug. 4, 2016

(65) Prior Publication Data
US 2018/0019790 A1    Jan. 18, 2018

(51) Int. Cl.
*H04W 4/00*  (2018.01)
*H04B 7/0417*  (2017.01)
(Continued)

(52) U.S. Cl.
CPC ......... *H04B 7/0417* (2013.01); *H04B 7/0456* (2013.01); *H04B 17/318* (2015.01);
(Continued)

(58) Field of Classification Search
None
See application file for complete search history.

(56) References Cited

U.S. PATENT DOCUMENTS

| 2012/0113816 A1 | 5/2012 | Bhattad et al. |
| 2012/0155414 A1* | 6/2012 | Noh ............... H04B 7/0417 370/329 |

(Continued)

FOREIGN PATENT DOCUMENTS

| EP | 2901568 A1 | 8/2015 |
| WO | 2014/109548 A1 | 7/2014 |

OTHER PUBLICATIONS

"3rd Generation Partnership Project; Technical Specification Group Radio Access Network; Evolved Universal Terrestrial Radio Access (E-UTRA); Physical Channels and Modulation(Release 12)", 3GPP TS 36.211, V12.4.0, Dec. 2014, pp. 1-124.

(Continued)

*Primary Examiner* — Farah Faroul
(74) *Attorney, Agent, or Firm* — Squire Patton Boggs (US) LLP

(57) ABSTRACT

A method and apparatus may include receiving, by a first network node, mapping information from at least one second network node. The mapping information indicates restrictions with respect to antenna ports to be used for measurements on each of one or more channel-state-information-reference-signal resources transmitted by at least one second network node. The method may also include transmitting a message to a user equipment. The message configures the user equipment to measure channel-state-information-reference-signal-received power from at least one of said one or more channel-state-information-reference-signal resources. The method may also include receiving a reporting from the user equipment.

19 Claims, 7 Drawing Sheets

(51) Int. Cl.
  *H04B 7/0456* (2017.01)
  *H04B 17/318* (2015.01)
  *H04W 24/08* (2009.01)
  *H04L 5/00* (2006.01)
  *H04W 8/00* (2009.01)
  *H04W 84/04* (2009.01)
  *H04B 7/06* (2006.01)

(52) U.S. Cl.
  CPC ........... *H04W 24/08* (2013.01); *H04B 7/0695* (2013.01); *H04L 5/0023* (2013.01); *H04L 5/0091* (2013.01); *H04W 8/005* (2013.01); *H04W 84/042* (2013.01)

(56) References Cited

U.S. PATENT DOCUMENTS

| | | | | |
|---|---|---|---|---|
| 2013/0077513 A1* | 3/2013 | Ng | ........................ | H04B 7/024 370/252 |
| 2013/0163530 A1* | 6/2013 | Chen | ..................... | H04W 72/04 370/329 |
| 2013/0196675 A1 | 8/2013 | Xiao et al. | | |
| 2014/0086285 A1 | 3/2014 | Yang et al. | | |
| 2014/0112184 A1* | 4/2014 | Chai | ..................... | H04L 5/0091 370/252 |
| 2014/0171073 A1* | 6/2014 | Kim | ..................... | H04W 48/16 455/434 |
| 2014/0314041 A1* | 10/2014 | Kim | ..................... | H04L 5/0048 370/329 |
| 2015/0036612 A1* | 2/2015 | Kim | ....................... | H04B 17/00 370/329 |
| 2015/0092655 A1* | 4/2015 | Liao | ........................ | H04J 11/005 370/312 |
| 2015/0092768 A1* | 4/2015 | Ng | ......................... | H04W 48/16 370/350 |
| 2015/0181450 A1* | 6/2015 | Xin | ........................ | H04W 76/28 370/252 |
| 2015/0208366 A1* | 7/2015 | Papasakellariou | .. | H04W 52/244 370/311 |
| 2015/0288497 A1* | 10/2015 | Li | ......................... | H04B 7/0413 370/329 |
| 2016/0174093 A1* | 6/2016 | Zhou | ..................... | H04L 5/0057 370/252 |
| 2016/0269978 A1* | 9/2016 | Bashar | ..................... | H04J 11/00 |
| 2017/0164226 A1* | 6/2017 | Wei | ........................ | H04L 5/0023 |
| 2017/0353222 A1* | 12/2017 | Wei | ........................ | H04B 7/0469 |

OTHER PUBLICATIONS

"Discussion on RS Design Enhancements", 3GPP TSG RAN WG1 Meeting #79, R1-144912, Agenda item: 6.3.3.3, LG Electronics, Nov. 17-21, 2014, pp. 1-8.

"On Cell Association of Fd Mimo Evaluation", 3GPP TSG RAN WG1 Meeting #79, R1-144634, Agenda Item: 6.3.3.3, CATT, Nov. 17-21, 2014, pp. 1-3.

"On Reference Signals for RRM Measurements in FD-MIMO", 3GPP TSG RAN WG1 #79, R1-145022, Agenda Item: 6.3.3.3, Sony, Nov. 17-21, 2014, 3 pages.

"Performance of Rel-12 DL MIMO using 3D-UMa and 3D-UMi", 3GPP TSG-RAN WG1 #79, R1-145086, Agenda Item: 6.3.3.2, Qualcomm Incorporated, Nov. 17-21, 2014, pp. 1-3.

International Search Report and Written Opinion received for corresponding Patent Cooperation Treaty Application No. PCT/US2015/013863, dated Apr. 22, 2015, 11 pages.

* cited by examiner

METHOD AND APPARATUS FOR PERFORMING RADIO-RESOURCE-MANAGEMENT MEASUREMENTS

RELATED APPLICATION

This application was originally filed as PCT Application No. PCT/US2015/013863 filed Jan. 30, 2015.

BACKGROUND

Field

Embodiments of the present invention relate to performing radio-resource-management measurements.

Description of the Related Art

Long-term Evolution (LTE) is a standard for wireless communication that seeks to provide improved speed and capacity for wireless communications by using new modulation/signal processing techniques. The standard was proposed by the 3$^{rd}$ Generation Partnership Project (3GPP), and is based upon previous network technologies. Since its inception, LTE has seen extensive deployment in a wide variety of contexts involving the communication of data.

SUMMARY

According to a first embodiment, a method may comprise receiving, by a first network node, mapping information from at least one second network node. The mapping information indicates restrictions with respect to antenna ports to be used for measurements on each of one or more channel-state-information-reference-signal resources transmitted by the at least one second network node. The method may also include transmitting a message to a user equipment. The message configures the user equipment to measure channel-state-information-reference-signal-received power from at least one of said one or more channel-state-information-reference-signal resources. The method may also include receiving a reporting from the user equipment.

In the method of the first embodiment, transmitting the message to the user equipment further comprises indicating, to the user equipment, the restrictions with respect to antenna ports to be used for measurements.

In the method of the first embodiment, the restrictions define that: all the antenna ports associated with the said at least one channel-state-information-reference signal resource must be measured by a user equipment for channel-state-information-reference-signal-received power, or only a subset of antenna ports associated with the said at least one channel-state-information-reference signal resource must be measured by a user equipment for channel-state-information-reference-signal-received power.

In the method of the first embodiment, the method may further include determining at least one of a serving cell and a beam to be used by the user equipment. The determining may based on the received reporting. The method may also include transmitting results of the determining to the user equipment.

In the method of the first embodiment, the receiving the reporting comprises receiving a channel-state-information-reference-signal-received-power and/or a received-signal-received-power measurement report.

In the method of the first embodiment, the method may further include transmitting timing information of discovery signals to the user equipment, for the user equipment to perform discovery signal measurements in accordance with the transmitted timing information.

In the method of the first embodiment, the first network node comprises a serving evolved Node B, and the second network node comprises an evolved Node B that neighbors the serving evolved Node B.

In the method of the first embodiment, the method may further include signaling preceding codebook information for each configured channel-state-information-reference-signal resource to the user equipment. The precoding codebook information further indicates associations between a subset of antenna ports of the one or more channel-state-information-reference-signal resources and a precoding codebook. The method may also include configuring the user equipment to measure a channel-state-information-reference-signal-received power of at least one combined channel from at least two antenna ports by using a selected codeword from the precoding codebook based on the received precoding codebook information.

According to a second embodiment, an apparatus may comprise at least one processor. The apparatus may also comprise at least one memory including computer program code. The at least one memory and the computer program code may be configured, with the at least one processor, to cause the apparatus at least to receive mapping information from at least one network node. The mapping information indicates restrictions with respect to antenna ports to be used for measurements on each of one or more channel-state-information-reference-signal resources transmitted by the at least one network node. The apparatus may also be caused to transmit a message to a user equipment. The message configures the user equipment to measure channel-state-information-reference-signal-received power from at least one of said one or more channel-state-information-reference-signal resources. The apparatus may also be caused to receive a reporting from the user equipment.

In the apparatus of the second embodiment, transmitting the message to the user equipment further comprises indicating, to the user equipment, the restrictions with respect to antenna ports to be used for measurements.

In the apparatus of the second embodiment, the restrictions define that: all the antenna ports associated with the said at least one channel-state-information-reference signal resource must be measured by a user equipment for channel-state-information-reference-signal-received power, or only a subset of antenna ports associated with the said at least one channel-state-information-reference signal resource must be measured by a user equipment for channel-state-information-reference-signal-received power.

In the apparatus of the second embodiment, the apparatus is further caused to determine at least one of a serving cell and a beam to be used by the user equipment. The determining is based on the received reporting. The apparatus is further caused to transmit results of the determining to the user equipment.

In the apparatus of the second embodiment, the receiving the reporting comprises receiving a channel-state-information-reference-signal-received-power and/or a received-signal-received-power measurement report.

In the apparatus of the second embodiment, the apparatus is further caused to transmit timing information of discovery signals to the user equipment, for the user equipment to perform discovery signal measurements in accordance with the transmitted timing information.

In the apparatus of the second embodiment, the apparatus comprises a serving evolved Node B, and the network node comprises an evolved Node B that neighbors the serving evolved Node B.

In the apparatus of the second embodiment, the apparatus may be further caused to signal precoding codebook information for each configured channel-state-information-reference-signal resource to the user equipment. The precoding codebook information further indicates associations between a subset of antenna ports of the one or more channel-state-information-reference-signal resources and a precoding codebook. The apparatus may be further caused to configure the user equipment to measure a channel-state-information-reference-signal-received power of at least one combined channel from at least two antenna ports by using a selected codeword from the precoding codebook based on the received precoding codebook information.

According to a third embodiment, a computer program may be embodied on a computer readable medium. The computer program configured to control a processor to perform a method according to the first embodiment.

According to a fourth embodiment, a method may comprise receiving, by a user equipment, a message from a first network node. The message may indicate restrictions with respect to antenna ports to be used for measurements on each of one or more channel-state-information-reference-signal resources transmitted by at least one second network node. The message configures the user equipment to measure channel-state-information-reference-signal-received power from at least one of said one or more channel-state-information-reference-signal resources. The method may also include measuring channel-state-information-reference-signal-received-power based on the received message. The method may also include reporting the measurement results to the first network node.

In the method of the fourth embodiment, the restrictions define that: all the antenna ports associated with the said at least one channel-state-information-reference-signal resource must be measured by a user equipment for channel-state-information-reference-signal-received power, or only a subset of antenna ports associated with the said at least one channel-state-information-reference signal resource must be measured by a user equipment for channel-state-information-reference-signal-received power.

In the method of the fourth embodiment, the method may further include receiving results of a determination performed by the first network node, the results indicating at least one of a serving cell and a beam. The method may also include utilizing the at least one of a serving cell and a beam based on the received results.

In the method of the fourth embodiment, the reporting comprises transmitting a channel-state-information-reference-signal-received-power and/or a received-signal-received-power report.

In the method of the fourth embodiment, the method may further include receiving timing information of discovery signals from the first network node. The method may also include performing discovery signal measurement in accordance with the received timing information.

In the method of the fourth embodiment, the first network node comprises a serving evolved Node B, and the at least one second network node comprises an evolved Node B that neighbors the serving evolved Node B.

In the method of the fourth embodiment, the method may also include receiving precoding codebook information for each configured channel-state-information-reference-signal resource from the first network node. The precoding codebook information further indicates associations between a subset of antenna ports of the one or more channel-state-information-reference-signal resources and a precoding codebook. The method may also include measuring a channel-state-information-reference-signal-received power of at least one combined channel from at least two antenna ports by using a selected codeword from the precoding codebook based on the received precoding codebook information.

According to a fifth embodiment, an apparatus may include at least one processor. The apparatus may also include at least one memory including computer program code. The at least one memory and the computer program code may be configured, with the at least one processor, to cause a user equipment at least to receive a message from a first network node. The message indicates restrictions with respect to antenna ports to be used for measurements on each of one or more channel-state-information-reference-signal resources transmitted by at least one second network node. The message configures the user equipment to measure channel-state-information-reference-signal-received power from at least one of said one or more channel-state-information-reference-signal resources. The apparatus may also be caused to measure channel-state-information-reference-signal-received-power based on the received message. The apparatus may also be caused to report the measurement results to the first network node.

In the apparatus of the fifth embodiment, the restrictions define that: all the antenna ports associated with the said at least one channel-state-information-reference signal resource must be measured by the user equipment for channel-state-information-reference-signal-received power, or only a subset of antenna ports associated with the said at least one channel-state-information-reference signal resource must be measured by the user equipment for channel-state-information-reference-signal-received power.

In the apparatus of the fifth embodiment, the user equipment is further caused to receive results of a determination performed by the first network node, the results indicating at least one of a serving cell and a beam. The user equipment may be further caused to utilize the at least one of a serving cell and a beam based on the received results.

In the apparatus of the fifth embodiment, the reporting comprises transmitting a channel-state-information-reference-signal-received-power and/or a received-signal-received-power report.

In the apparatus of the fifth embodiment, the user equipment is further caused to receive timing information of discovery signals from the first network node. The user equipment may be further caused to perform discovery signal measurement in accordance with the received timing information.

In the apparatus of the fifth embodiment, the apparatus comprises the user equipment. The first network node comprises a serving evolved Node B, and the at least one second network node comprises an evolved Node B that neighbors the serving evolved Node B.

In the apparatus of the fifth embodiment, the user equipment is further caused to receive precoding codebook information for each configured channel-state-information-reference-signal resource from the first network node. The precoding codebook information further indicates associations between a subset of antenna ports of the one or more channel-state-information-reference-signal resources and a precoding codebook. The user equipment may be further caused to measure a channel-state-information-reference-signal-received power of at least one combined channel from at least two antenna ports by using a selected codeword from the precoding codebook based on the received precoding codebook information.

According to sixth embodiment, a computer program may be embodied on a computer readable medium, the computer program configured to control a processor to perform a method according to the fourth embodiment.

According to a seventh embodiment, a system may include a first apparatus. The first apparatus may comprise a first receiving unit that receives mapping information from at least one network node. The mapping information indicates restrictions with respect to antenna ports to be used for measurements on each of one or more channel-state-information-reference-signal resources transmitted by the at least one network node. The first apparatus may also include a transmitting unit that transmits a message to a second apparatus. The message configures the second apparatus to measure channel-state-information-reference-signal-received power from at least one of said one or more channel-state-information-reference-signal resources. The first apparatus may also include a second receiving unit that receives a reporting from the second apparatus. The system may also include the second apparatus. The second apparatus may also include a third receiving unit that receives the message from the first apparatus. The second apparatus may also include a measuring unit that measures the channel-state-information-reference-signal-received-power based on the received message. The second apparatus may also include a reporting unit that reports the measurement results to the first apparatus.

According to an eighth embodiment, an apparatus may comprise a first receiving means that receives mapping information from at least one network node. The mapping information indicates restrictions with respect to antenna ports to be used for measurements on each of one or more channel-state-information-reference-signal resources transmitted by the at least one network node. The apparatus may also comprise a transmitting means that transmits a message to a user equipment. The message configures the user equipment to measure channel-state-information-reference-signal-received power from at least one of said one or more channel-state-information-reference-signal resources. The apparatus may also comprise second receiving means to receive a reporting from the user equipment.

According to a ninth embodiment, an apparatus may include receiving means for receiving a message from a first network node. The message indicates restrictions with respect to antenna ports to be used for measurements on each of one or more channel-state-information-reference-signal resources transmitted by at least one second network node. The message configures the user equipment to measure channel-state-information-reference-signal-received power from at least one of said one or more channel-state-information-reference-signal resources. The apparatus may also include measuring means to measure channel-state-information-reference-signal-received-power based on the received message. The apparatus may also include reporting means to report the measurement results to the first network node.

BRIEF DESCRIPTION OF THE DRAWINGS

For proper understanding of the invention, reference should be made to the accompanying drawings, wherein.

DETAILED DESCRIPTION

Figure 1:
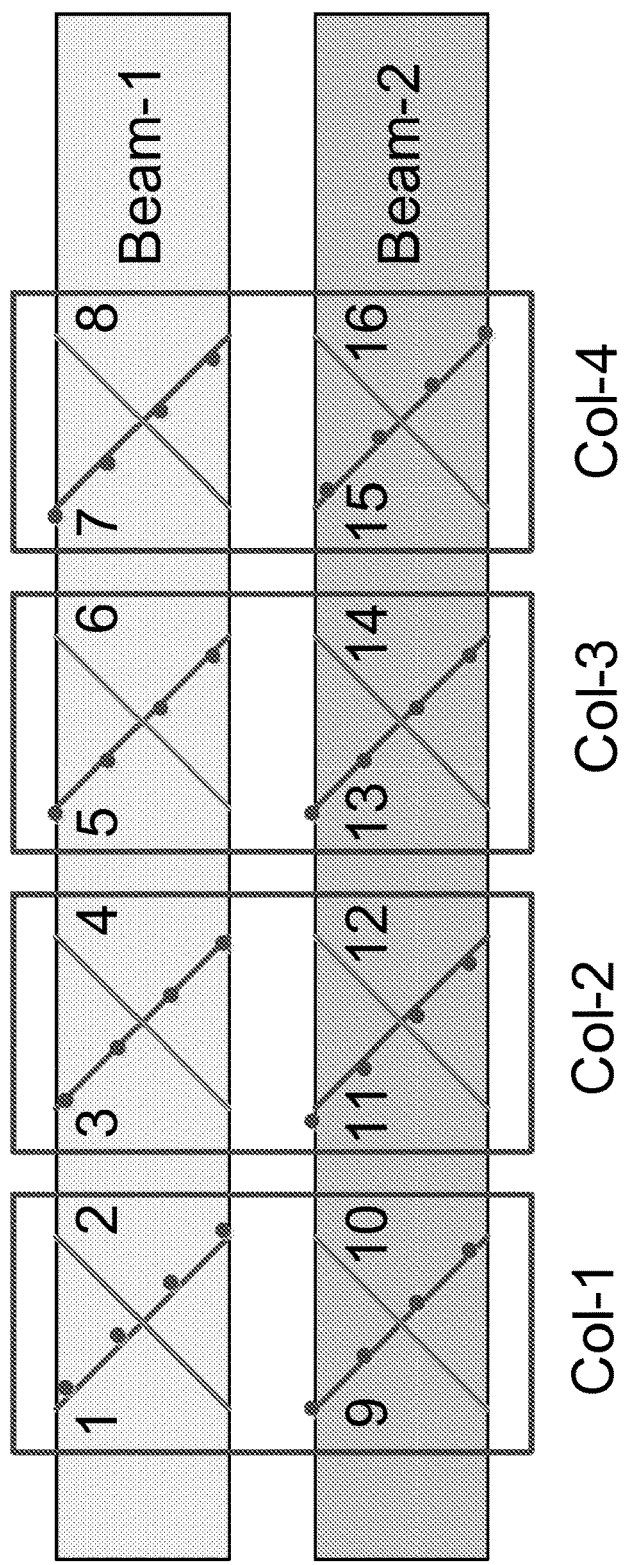
FIG. 1 illustrates a plurality of TXRUs within a rectangular X-polarized panel.

Certain embodiments of the present invention relate to performing radio-resource-management measurements. For example, certain embodiments of the present invention may perform radio-resource-management measurements for elevation beamforming and full-dimensional multiple-input and multiple-output (FD-MIMO). Certain embodiments of the present invention may relate to massive MIMO (where tens of antennas are utilized at the eNB side) and channel-state-information (CSI) reporting.

An eNB may steer the elevation of multiple narrow beams to either sectorize a cell or to adjust the physical-downlink shared channel (PDSCH) coverage based on a load and/or traffic. This optimization of PDSCH coverage is generally not aligned with any common (cell-specific) reference signal (CRS) that is designed for broad coverage. Therefore, this mismatch of PDSCH and CRS coverage may result in a significant loss in system performance. A related problem is that Massive MIMO facilitates use of a large number of transceivers (such as 16, 32, or 64 transceivers, for example) at the eNB side.

Using such a large number of receivers can create significant technical difficulties in terms of UE complexity, especially related to handling multi-port CQI feedback. From a CSI feedback perspective, using such a large number of receivers generally results in a heavy burden on the UEs, both from a complexity perspective and from a payload perspective. Therefore, the CSI feedback for 16, 32, or 64 ports may need to be rather slow or require extensive uplink overhead. Another issue with massive MIMO is that cell-association (which is typically determined based on CRS) may be sub-optimal. The cell-association may be suboptimal because the coverage of PDSCH can vary significantly from the coverage of CRS, when an active antenna system (AAS) is used to steer narrow beams in multiple elevation directions.

Embodiments of the present invention may enable a method of beam selection that can be applied in order to select a beam (for a UE) that is the most appropriate beam. Embodiments of the present invention may also enable re-selecting the serving cell for a UE by utilizing a discovery signal framework that is already introduced in Release 12.

As discussed above, utilizing AAS antennas at the eNB provides the ability to steer multiple narrow beams (in terms of elevation) to either sectorize a cell or to adjust the PDSCH coverage based on load and traffic. This optimization for PDSCH is not aligned with CRS that is designed for broad coverage. Due to cost and complexity reasons, it is generally not feasible to have dedicated transceivers (TXRUs) for CRS. Therefore, as described above, this mismatch of PDSCH and CRS coverage may lead to a significant loss in system performance.

As described above, Massive MIMO facilitates use of a large number of transceivers (16, 32 and/or 64) at the eNB side. As described above, using a large number of transceivers may result in technical difficulties in terms of standardization and also from a UE complexity point of view. Moreover, some of the properties of the channel (i.e., the beam) will not change very dynamically, and thus reporting a 16, 32 and/or 64-antenna codebook may not be necessary.

The above-described technical difficulties may be addressed by inter-eNB communication that communicates an association between a CSI-RS resource configuration and a virtual beam, as described in more detail below. The inter-eNB communication may be performed as follows.

The serving eNB may be informed of a mapping of channel-state-information-reference-signal (CSI-RS) resources to beams, that is, vertical and/or horizontal beams transmitted from the neighboring eNBs. The serving eNB may be informed via inter-eNB exchange/communication of information. Beam-IDs may be needed to identify the beams at the eNB because, if a CSI-RS resource spans over 2 beams (such as over CSI-RS antenna ports 15 and 16, for example), then reference-signal-received-power (RSRP) must be measured for both antenna ports 15 and 16. A Beam-ID may be represented by a restriction on the ports of a CSI-RS resource. For example, in this particular case, the restriction may be that a UE must measure both ports 15 and 16 in order to reflect the received power from the CSI-RS resource accurately. The eNB will then configure a Release 12 UE with 2 CSI-RSRPs (as described in more detail below). Note that an alternative way to place a restriction would be to indicate that all the ports associated to a particular CSI-RS resource must be measured to reflect the received power from the CSI-RS resource accurately. If the CSI-RS resource spans over 1 beam, then the eNB will configure a Release 12 UE with only 1 CSI-RSRP antenna port to measure. That is, the exchanging of information may ensure that, for example, a Release 12 UE is configured with 2 RSRP reports (one report for port 15 and another separate report for port 19). Otherwise, the UE would report RSRP inaccurately. In certain embodiments, the CSI-RS configuration itself can include ports, but only two are necessary to be identified in the Report 2, as described in more detail below.

The eNB may then instruct the UE to set up the timing configuration of the measurement of discovery signals.

The eNB may then inform the UE about a list of CSI-RS resources of neighboring cells for RSRP measurement.

The UE may then measure CSI-RSRP, based upon the configured list of CSI-RS resources, and report the results of the measurement to the serving eNB. Additionally, the UE may also measure RSRP (from CRS) based on the configured list of Physical Cell ID (PCID), and report to the serving eNB. CRS may come from one cell. RSRP may correspond to a beam, for example, a virtual sector within a cell. With certain embodiments of the present invention, there maybe two beams in one cell, and CSI-RSRP may then be used for selecting the stronger beam of the two beams.

The serving eNB may consider the reported CSI-RSRP and RSRP (from CRS), and the serving eNB may determine the best serving cell and strongest beam for the UE.

For Release 13 UEs, the following steps may be performed as well. The serving eNB may signal a codebook to the UE for each configured CSI-RS resource. The serving eNB may also signal a mapping of a subset of the CSI-RS antenna ports to a precoding codebook. The CSI-RS ports may be ports 15 and 19, for example. The UE may be instructed to measure CSI-RS antenna ports 15 and 19 of a configured CSI-RS resource, and the UE may determine a new CSI-RSRP by using a selected codeword from the codebook for combining the channels of ports 15 and 19.

In view of the above, certain embodiments of the present invention may define a new CSI-RSRP definition for measurement by a UE that is conditioned on a codebook. The CSI-RSRP definition may be in units of power and may be quantized according to RSRP, which makes the CSI-RSRP definition distinct from conventional CQI, as described in more detail below.

As described above, certain embodiments of the present invention are directed to an inter-eNB communication/exchange of a map or association between a CSI-RS resource configuration and a virtual beam. The virtualization beam may possibly not be described, but the virtualization beam may be identified by a Beam-ID. This ID may take the form of a report like {CSI-RS resource config, beam-id, . . . }, as described in more detail below. This step may be performed in conjunction with a CSI-RSRP measurement, as defined by the Release 12 discovery framework.

FIG. 1 illustrates a plurality of TXRUs within a rectangular X-polarized panel. Consider 16 TXRUs within a rectangular X-polarized panel, connected to 4 columns using radio-frequency (RF) virtualization. The best-performing Release 12 scheme for legacy UEs may be a vertical sectorization, where the two vertical sectors may be associated with 2 RF beams and may belong to the same cell-ID.

Consider the following numbering of the 16 TXRUs as shown in FIG. 1. The TXRUs numbered 1, 2, 3, 4, 5, 6, 7, and 8 may be steered at +10 degrees from the horizon via a RF beam called Beam-1. The TXRUs numbered 9, 10, 11, 12, 13, 14, 15, and 16 may be steered at −10 degrees from the horizon via a RF beam called Beam-2. The TXRUs may belong to 4 columns as shown above. The TXRUs (corresponding to the dotted lines) may be associated with a −45 degrees polarization direction, and the TXRUs (corresponding to the un-dotted lines) may be associated with a +45 degrees polarization direction. The TXRU to CSI-RS antenna port mappings may follow a full-connection model or a sub-array model, as indicated in 3GPP Technical Report 36.879.

As discussed above, a first technical difficulty relates to overhead, in terms of UE complexity and system resources for continuously feeding back a 16-port CSI. A second technical difficulty is that the CRS may be assumed to be virtualized across Beam-1 and Beam-2 to 4 CRS ports using the same RF beams (Beam-1 and Beam-2) for the 16 TXRUs, as shown by FIG. 1. As an example, CRS port 0 may be mapped to TXRUs 1-16 using the weight [1,0,0,0, 0,0,0,0,1,0,0,0,0,0,0,0]/sqrt(2), where the non-zero powers are associated with TXRUs 1 and 9. It may be noted that not all the TXRUs need to be virtualized. In one example embodiment, the +45 degrees tilted TXRUs may be skipped, and this embodiment may map the −45 degrees tilted TXRUs column by column to CRS ports 0-3.

It maybe assumed that there does not exist any separate TXRUs that can used for transmitting CRS with an optimized RF wide beam. This will then result in a sub-optimal cell-association and can result in significant performance degradation. Therefore, a solution for improving the selection of a serving cell for a UE may be desirable.

In view of the above-described problems, certain embodiments of the present invention may provide a common solution. Certain embodiments of the present invention may be directed to a method that efficiently performs beam selection. Here, a beam may be a much smaller subset of the total number of ports (for example, 8 ports in FIG. 1 may constitute a beam). Certain embodiments of the present invention may define a method that enables the UE to select a beam. Specifically, certain embodiments of the present invention may use the discovery RS framework introduced in Release 12 for measurement and feedback of a newly-defined RSRP type metric. This enables massive MIMO operation with a total 16 antennas so that beam selection may be performed with a newly defined CSI-RSRP measurement and reporting, and the subsequent CSI feedback make take place for 8 antennas. The beam selection capability can also be used for re-assigning UEs to appropriate neighbour cells.

According to certain embodiments of the present invention, with a first step, the serving eNB may be informed of the mappings of CSI-RS antenna ports to elevation beams transmitted from the neighbouring eNBs. This may be communicated to the serving eNB via an interface such as X2.

Examples of such reports could be as follows. Report 1 may include {CSI-RS-id, PCID, CSI-RS resource configuration (TS 36.211 [21, table 6.10.5.2-1 and 6.10.5.2-2]), scrambling identity, subframe offset from SSS, beam-id}. This kind of report may be suitable if the power from this beam can be sufficiently captured by measuring only port 15. Report 2 may include {CSI-RS-id, PCID, CSI-RS resource configuration (TS 36.211 [21, table 6.10.5.2-1 and 6.10.5.2-2]), scrambling identity, subframe offset from SSS, beam-id, port 15, 19}. This kind of report may be suitable if the power from this beam can be sufficiently captured by measuring at least ports 15 and 19.

The exchange of CSI-RS information across eNBs was discussed during eCoMP SID. Certain embodiments of the present invention exchange a map or association of a CSI-RS to a beam-id.

With a second step, the serving eNB may signal dmtc-PeriodOffset to the UE using RRC signaling, and the UE may set up the discovery signals measurement timing configuration (DMTC) in accordance with dmtc-PeriodOffset. Discovery signals are reference signals used for cell or transmission point discovery and may include primary synchronization signal, secondary synchronization signal, CRS and CSI-RS transmitted with a periodicity of 40, 80 or 160 milliseconds, and dmtc-PeriodOffset indicates to the UE when to measure discovery signals.

With a third step, the serving eNB would signal IE MeasDS-Config to the UE using RRC signaling that provides a list of CSI-RS resources of neighbouring cells for RSRP measurement.

With a fourth step, the UE may be configured to measure CSI-RSRP from antenna port 15, considering the configured list of CSI-RS resources, and the UE may report the result of the measurement to the serving eNB. In addition, the UE may also measure RSRP (from CRS) considering the configured list of PCID, and the UE may report the result of the measurement to the serving eNB.

With a fifth step, the serving eNB may consider the reported CSI-RSRP and RSRP (from CRS) and may determine the best serving cell (as well as the beam) for the UE.

For Release 13 (and beyond) UEs, the above-described fourth step may be replaced by the following. The serving eNB may signal a codebook to the UE for each configured CSI-RS resource, and the serving eNB may signal a mapping of a subset of the CSI-RS ports to the codebook. For example, ports 15 and 19 may be mapped to a 2Tx codebook. As another option, the UE may be instructed to measure ports 15 and 19 of a configured CSI-RS, and the UE may determine a new CSI-RSRP by using a selected codeword from the codebook for combining the channels from ports 15 and 19. For example, the selected codeword may correspond to max $w^H R w$, where R is a 2×2 covariance matrix formed from ports 15 and 19. In addition, the UE may also measure RSRP (from CRS) considering the configured list of physical cell identities (PCID), and the UE may report to the serving eNB. RSRP may be measured from cells (not beams), such as from neighboring and/or serving cells. PCID (and CRS) may provide the eNB with information on the cells, while CSI-RS may help in beam selection.

Certain embodiments of the present invention may also include the following additional options. With one option, the number of beam ports may be less than the total number of ports for the same cell. With another option, CSI-feedback (Precoding-Matrix-Indicator (PMI), CQI, Rank Indicator (RI)) within a beam (after beam selection) may assume existing codebooks for 2, 4, and/or 8 antennas. With another option, there may be flexible configuration on the number of ports corresponding to a beam. Another option may use L1 signalling to report the selected beam (in addition to CSI-RSRP reporting).

With certain embodiments of the present invention, the overhead (in terms of UE complexity and system resources for continuously feeding back a 16-port CSI) may be quite significant. Certain embodiments of the present invention may enable selection of a subset of ports corresponding to a beam.

As described above, cell-association using CRS may be sub-optimal because the coverage of PDSCH can vary significantly from the coverage of CRS, when AAS is used to steer narrow beams in multiple elevation directions. Certain embodiments of the present invention enable re-selection of the serving cell for a UE by utilizing the discovery signal framework that is already introduced in Release 12. Certain embodiments of the present invention may provide the advantage of having a small specification impact, as well as providing the advantage of solving the cell-association problem.

In view of the above, certain embodiments of the present invention may provide the advantage that less CQI values need to be reported, while also enabling the re-selection of the serving cell and beam for the UE.

Figure 2:
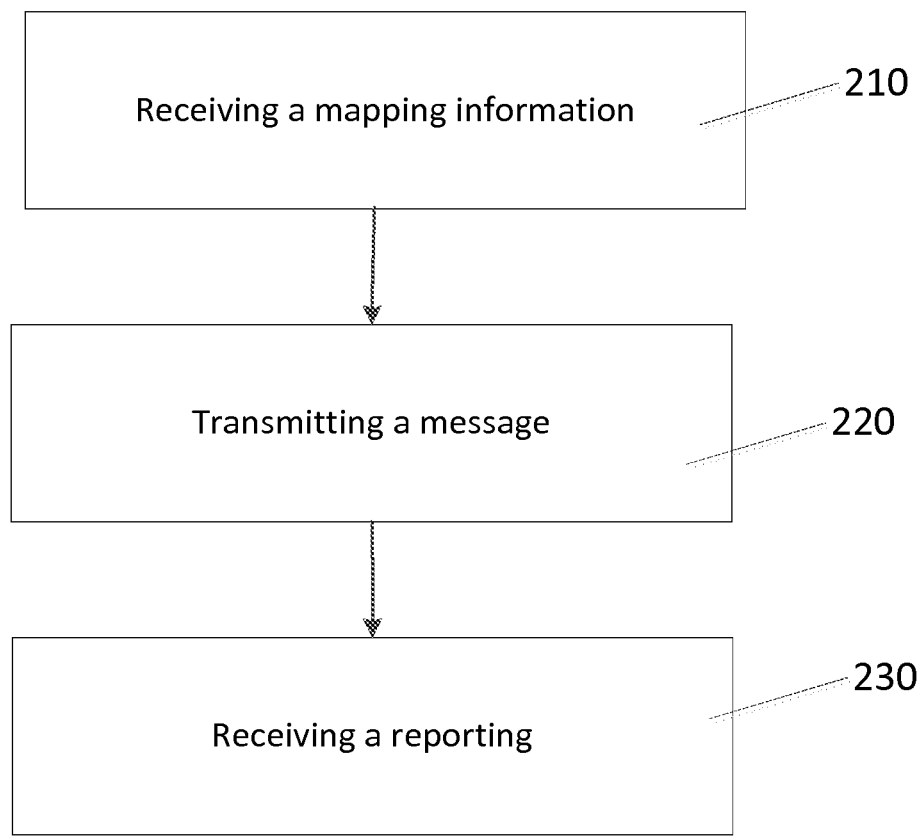
FIG. 2 illustrates a flowchart of a method in accordance with certain embodiments of the invention.

FIG. 2 illustrates a flowchart of a method in accordance with certain embodiments of the invention. The method illustrated in FIG. 2 includes, at 210, receiving, by a first network node, mapping information from at least one second network node. The mapping information indicates restrictions with respect to antenna ports to be used for measurements on each of one or more channel-state-information-reference-signal resources transmitted by the at least one second network node. The method may also include, at 220, transmitting a message to a user equipment. The message configures the user equipment to measure channel-state-information-reference-signal-received power from at least one of said one or more channel-state-information-reference-signal resources. The method may also include, at 230, receiving a reporting from the user equipment.

Figure 3:
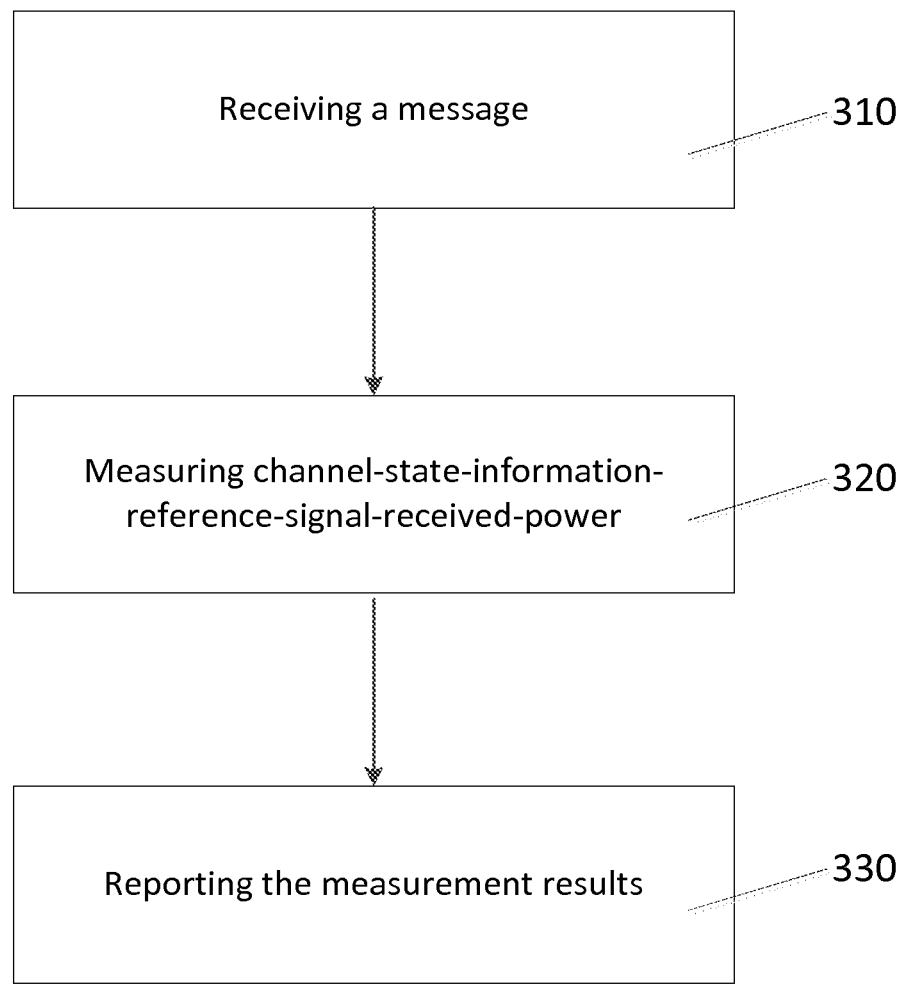
FIG. 3 illustrates a flowchart of a method in accordance with certain embodiments of the invention.

FIG. 3 illustrates a flowchart of a method in accordance with certain embodiments of the invention. The method illustrated in FIG. 3 includes, at 310, receiving, by a user equipment, a message from a first network node. The message indicates restrictions with respect to antenna ports to be used for measurements on each of one or more channel-state-information-reference-signal resources transmitted by at least one second network node. The message configures the user equipment to measure channel-state-information-reference-signal-received power from at least one of said one or more channel-state-information-reference-signal resources. The method may also include, at 320, measuring channel-state-information-reference-signal-received-power based on the received message. The method may also include, at 330, reporting the measurement results to the network node.

Figure 4:
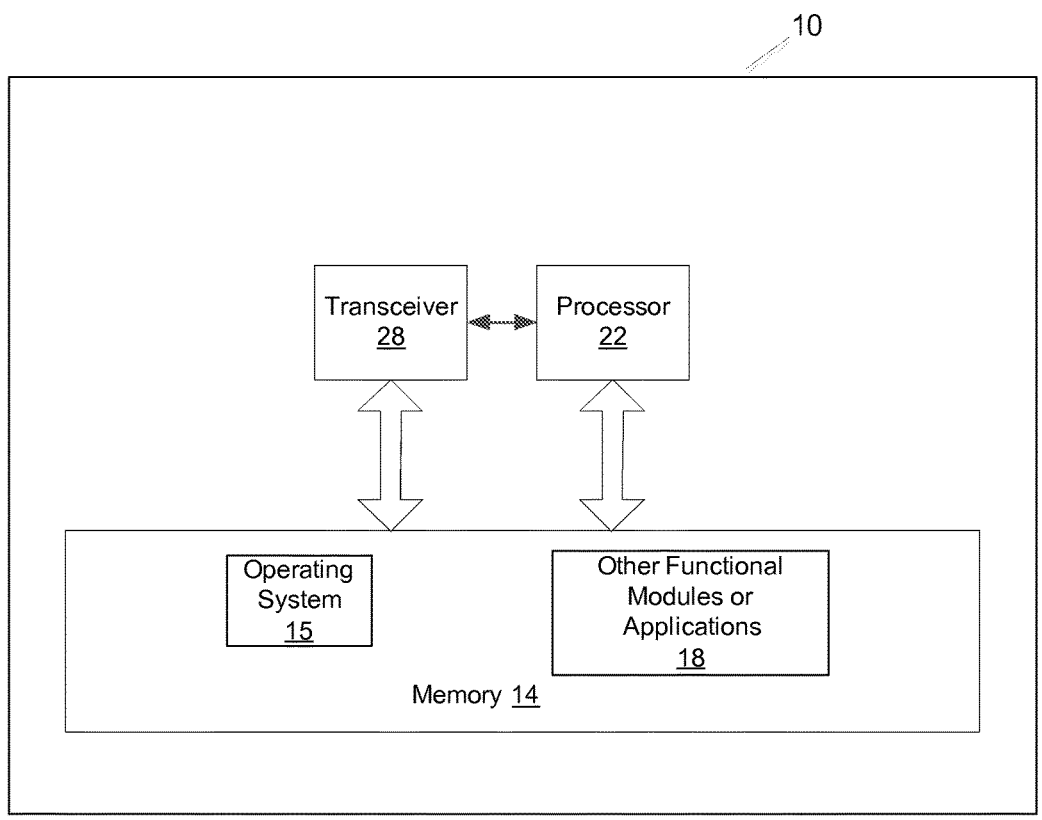
FIG. 4 illustrates an apparatus in accordance with certain embodiments of the invention.

FIG. 4 illustrates an apparatus in accordance with certain embodiments of the invention. In one embodiment, the apparatus can be a user equipment, a base station, and/or an evolved Node B (eNB), for example. Apparatus 10 can include a processor 22 for processing information and executing instructions or operations. Processor 22 can be any type of general or specific purpose processor. While a single processor 22 is shown in FIG. 4, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 5:
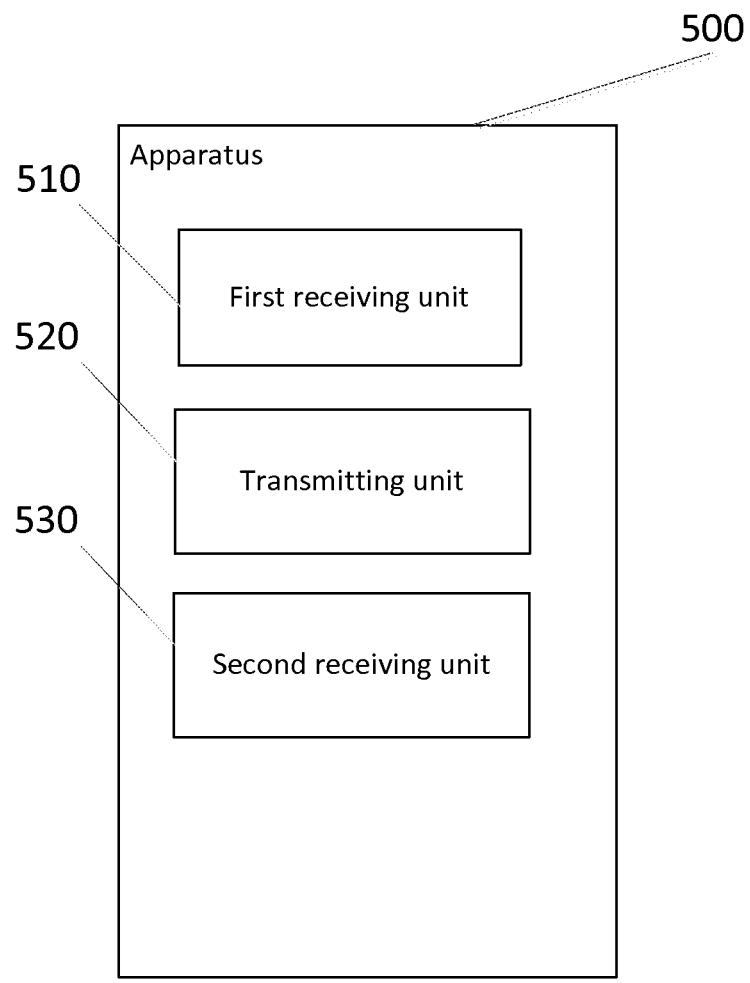
FIG. 5 illustrates an apparatus in accordance with certain embodiments of the invention.

FIG. 5 illustrates an apparatus in accordance with certain embodiments of the invention. Apparatus 500 can be a network element/entity such as a base station and/or evolved Node B, for example. Apparatus 500 can include a first receiving unit 510 for receiving mapping information from at least one second network node. The mapping information indicates restrictions with respect to antenna ports to be used for measurements on each of one or more channel-state-information-reference-signal resources transmitted by the at least one second network node. Apparatus 500 may also include a transmitting unit 520 for transmitting a message to a user equipment. The message configures the user equipment to measure channel-state-information-reference-signal-received power from at least one of said one or more channel-state-information-reference-signal resources. Apparatus 500 may also include a second receiving unit 530 that receives a reporting from the user equipment.

Figure 6:
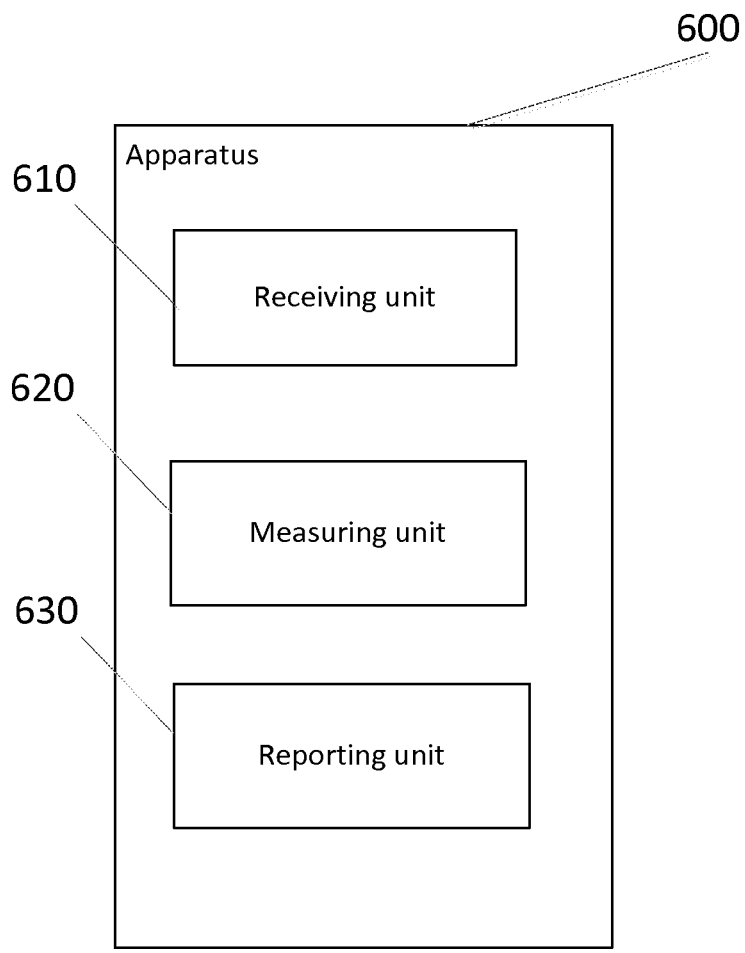
FIG. 6 illustrates an apparatus in accordance with certain embodiments of the invention.

FIG. 6 illustrates an apparatus in accordance with certain embodiments of the invention. Apparatus 600 can be a user equipment, for example. Apparatus 600 can include a receiving unit 610 that receives a message from a first network node. The message indicates restrictions with respect to antenna ports to be used for measurements on each of one or more channel-state-information-reference-signal resources transmitted by at least one second network node. The message configures the user equipment to measure channel-state-information-reference-signal-received power from at least one of said one or more channel-state-information-reference-signal resources. Apparatus 600 may also include a measuring unit 620 that measures channel-state-information-reference-signal-received-power based on the received message. Apparatus 600 may also include a reporting unit 630 that reports the measurement results to the first network node.

Figure 7:
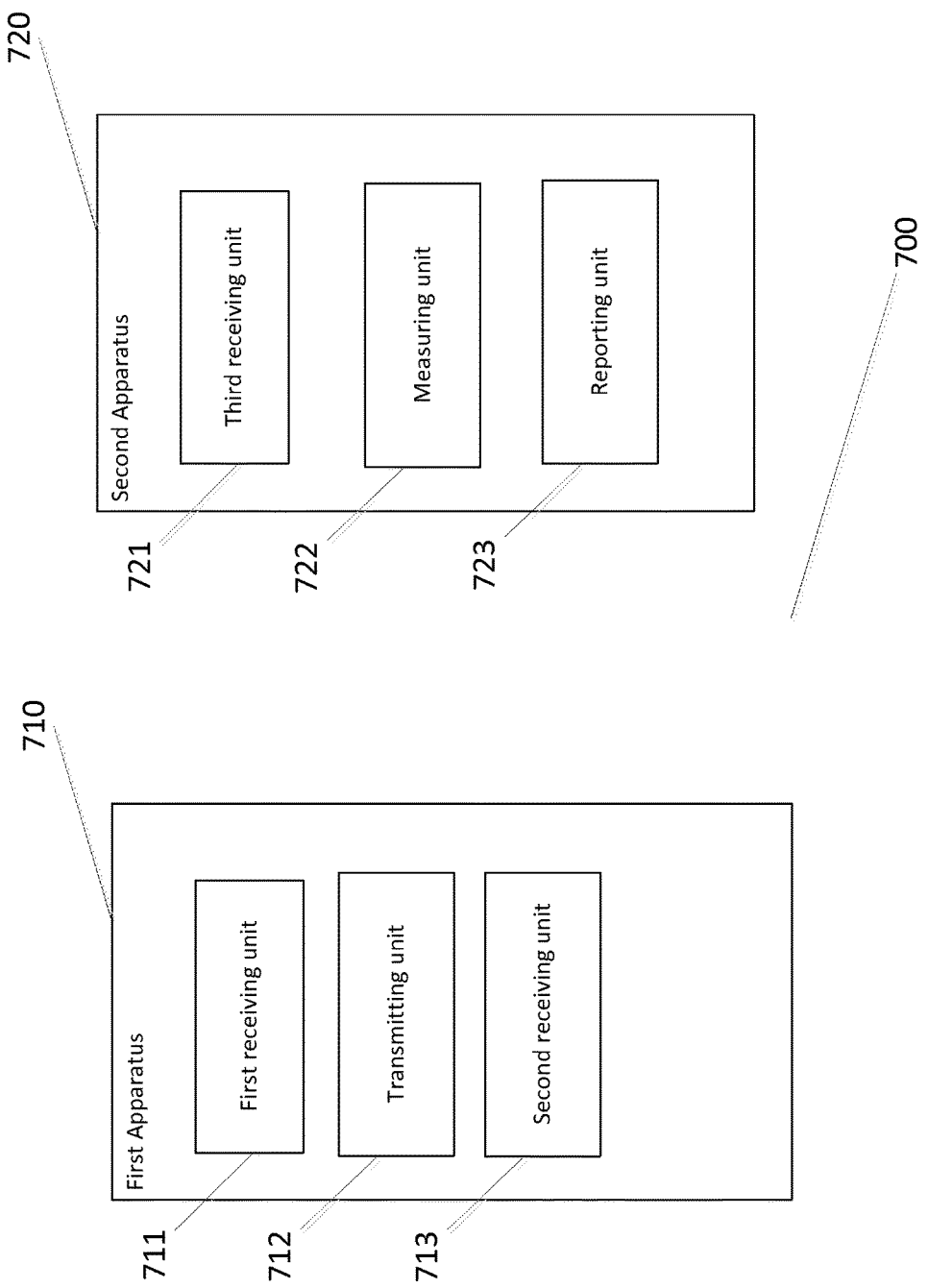
FIG. 7 illustrates a system in accordance with certain embodiments of the invention.

FIG. 7 illustrates a system in accordance with certain embodiments of the invention. A system 700 may comprise a first apparatus 710 and a second apparatus 720. The first apparatus 710 may comprise a first receiving unit 711 that receives mapping information from at least one network node. The mapping information indicates restrictions with respect to antenna ports to be used for measurements on each of one or more channel-state-information-reference-signal resources transmitted by the at least one network node. The first apparatus 710 may also include a transmitting unit 712 that transmits a message to the second apparatus 720. The message configures the second apparatus 720 to measure channel-state-information-reference-signal-received power from at least one of said one or more channel-state-information-reference-signal resources. The first apparatus 710 may also include a second receiving unit 713 that receives a reporting from the second apparatus 720. The second apparatus 720 may include a third receiving unit 721 that receives the message from the first apparatus 710. Second apparatus 720 may also include a measuring unit 722 that measures the channel-state-information-reference-signal-received-power based on the received message. Second apparatus 720 may also include a reporting unit 723 that reports the measurement results to the first apparatus 710.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
at least one processor; and
at least one memory including computer program code,
wherein the at least one memory and the computer program code are configured, with the at least one processor, to cause the apparatus at least to
receive mapping information from at least one network node, wherein the mapping information indicates restrictions with respect to antenna ports to be used for measurements on each of one or more channel-state-information-reference-signal resources transmitted by the at least one network node;
transmit a message to a user equipment, wherein the message configures the user equipment to measure channel-state-information-reference-signal-received power from at least one of said one or more channel-state-information-reference-signal resources; and
receive a reporting from the user equipment,
wherein transmitting the message to the user equipment further comprises indicating, to the user equipment, the restrictions with respect to antenna ports to be used for measurements.

2. The apparatus according to claim 1, wherein the restrictions define that:
all the antenna ports associated with the at least one channel-state-information-reference signal resource must be measured by the user equipment for channel-state-information-reference-signal-received power, or
only a subset of antenna ports associated with the said at least one channel-state-information-reference signal resource must be measured by the user equipment for channel-state-information-reference-signal-received power.

3. The apparatus according to claim 1, wherein the at least one memory and the computer program code are configured, with the at least one processor, to cause the apparatus further to:
determine at least one of a serving cell and a beam to be used by the user equipment, wherein the determining is based on the received reporting; and
transmit results of the determining to the user equipment.

4. The apparatus according to claim 1, wherein the receiving the reporting comprises receiving at least one of a channel-state-information-reference-signal-received-power and a reference-signal-received-power measurement report.

5. The apparatus according to claim 1, wherein the at least one memory and the computer program code are configured, with the at least one processor, to cause the apparatus further to:
transmit timing information of discovery signals to the user equipment, for the user equipment to perform discovery signal measurements in accordance with the transmitted timing information.

6. The apparatus according to claim 1, wherein the apparatus comprises a serving evolved Node B, and the network node comprises an evolved Node B that neighbors the serving evolved Node B.

7. The apparatus of claim 1, wherein the at least one memory and the computer program code are configured, with the at least one processor, to cause the apparatus further to:
signal precoding codebook information for each configured channel-state-information-reference-signal resource to the user equipment, wherein the precoding codebook information further indicates associations between a subset of antenna ports of the one or more channel-state-information-reference-signal resources and a precoding codebook; and
configure the user equipment to measure a channel-state-information-reference-signal-received power of at least one combined channel from at least two antenna ports by using a selected codeword from the precoding codebook based on the received precoding codebook information.

8. A method, comprising: receiving, by a user equipment, a message from a first network node, wherein the message indicates restrictions with respect to antenna ports to be used for measurements on each of one or more channel-state-information-reference-signal resources transmitted by at least one second network node, and wherein the message configures the user equipment to measure channel-state-information-reference-signal-received power from at least one of said one or more channel-state-information-reference-signal resources; measuring channel-state-information-reference-signal-received-power based on the received message; and reporting the measurement results to the first network node.

9. The method according to claim 8, wherein the restrictions define that:
all the antenna ports associated with the at least one channel-state-information-reference-signal resource must be measured by the user equipment for channel-state-information-reference-signal-received power, or
only a subset of antenna ports associated with the said at least one channel-state-information-reference signal resource must be measured by the user equipment for channel-state-information-reference-signal-received power.

10. The method according to claim 8, further comprising:
receiving results of a determination performed by the first network node, the results indicating at least one of a serving cell and a beam; and
utilizing the at least one of a serving cell and a beam based on the received results.

11. The method according to claim 8, wherein the reporting comprises transmitting at least one of a channel-state-information-reference-signal-received-power and a reference-signal-received-power report.

12. The method according to claim 8, further comprising:
receiving timing information of discovery signals from the first network node; and
performing discovery signal measurement in accordance with the received timing information.

13. An apparatus, comprising:
at least one processor; and
at least one memory including computer program code,
wherein the at least one memory and the computer program code are configured, with the at least one processor, to cause a user equipment at least to:
receive a message from a first network node, wherein the message indicates restrictions with respect to antenna ports to be used for measurements on each of one or more channel-state-information-reference-signal resources transmitted by at least one second network node, and wherein the message configures the user equipment to measure channel-state-information-reference-signal-received power from at least one of said one or more channel-state-information-reference-signal resources;

measure channel-state-information-reference-signal-received-power based on the received message; and report the measurement results to the first network node.

14. The apparatus according to claim 13, wherein the restrictions define that:
  all the antenna ports associated with the at least one channel-state-information-reference signal resource must be measured by the user equipment for channel-state-information-reference-signal-received power, or
  only a subset of antenna ports associated with the at least one channel-state-information-reference signal resource must be measured by the user equipment for channel-state-information-reference-signal-received power.

15. The apparatus according to claim 13, wherein the at least one memory and the computer program code are configured, with the at least one processor, to cause the user equipment further:
  receive results of a determination performed by the first network node, the results indicating at least one of a serving cell and a beam; and
  utilize the at least one of a serving cell and a beam based on the received results.

16. The apparatus according to claim 13, wherein the reporting comprises transmitting at least one of a channel-state-information-reference-signal-received-power and a reference-signal-received-power report.

17. The apparatus according to claim 13, wherein the at least one memory and the computer program code are configured, with the at least one processor, to cause the user equipment further to:
  receive timing information of discovery signals from the first network node; and
  perform discovery signal measurement in accordance with the received timing information.

18. The apparatus according to claim 13, wherein the apparatus comprises the user equipment, the first network node comprises a serving evolved Node B, and the at least one second network node comprises an evolved Node B that neighbors the serving evolved Node B.

19. The apparatus according to claim 13, wherein the at least one memory and the computer program code are configured, with the at least one processor, to cause the user equipment further to:
  receive precoding codebook information for each configured channel-state-information-reference-signal resource from the first network node, wherein the precoding codebook information further indicates associations between a subset of antenna ports of the one or more channel-state-information-reference-signal resources and a precoding codebook; and
  measure a channel-state-information-reference-signal-received power of at least one combined channel from at least two antenna ports by using a selected codeword from the precoding codebook based on the received precoding codebook information.

* * * * *